US012749965B2

(12) United States Patent
Widek et al.

(10) Patent No.: US 12,749,965 B2
(45) Date of Patent: Sep. 29, 2026

(54) SYSTEM, A CONTROL UNIT AND A METHOD FOR CONTROLLING CAPACITORS IN THE SYSTEM IN AN AT LEAST PARTLY ELECTRICAL DRIVEN VEHICLE

(71) Applicant: VOLVO TRUCK CORPORATION, Gothenburg (SE)

(72) Inventors: Per Widek, Torslanda (SE); Jonas Ottosson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 967 days.

(21) Appl. No.: 18/062,412

(22) Filed: Dec. 6, 2022

(65) Prior Publication Data

US 2023/0182581 A1 Jun. 15, 2023

(30) Foreign Application Priority Data

Dec. 9, 2021 (EP) .................................... 21213366

(51) Int. Cl.
*H02M 1/12* (2006.01)
*B60L 50/40* (2019.01)
(Continued)

(52) U.S. Cl.
CPC ............ *H02M 1/123* (2021.05); *B60L 50/40* (2019.02); *H01M 10/44* (2013.01); *H01M 10/46* (2013.01);
(Continued)

(58) Field of Classification Search
CPC ..................................................... H02M 1/123
(Continued)

(56) References Cited

U.S. PATENT DOCUMENTS

2011/0094075 A1* 4/2011 Lee ......................... H02M 1/44 29/25.41
2013/0293047 A1* 11/2013 Nagasaka .............. H02K 11/05 310/72
(Continued)

FOREIGN PATENT DOCUMENTS

CN 112234839 A * 1/2021 ............. H02M 5/10
DE 102018002926 A1 9/2018
(Continued)

OTHER PUBLICATIONS

Extended European Search Report in corresponding European Application No. 21213366.4 dated Jun. 1, 2022 (8 pages).

*Primary Examiner* — Jerry D Robbins
(74) *Attorney, Agent, or Firm* — Jeffri A. Kaminski; Venable LLP

(57) ABSTRACT

A system for controlling capacitors comprised in an at least partly electrical driven vehicle. The system comprises a converter comprising a first capacitor connected to a first side of a three-phase bridge. The system comprises a third capacitor adapted to be controlled, via a first switch, to be either connected in parallel to or disconnected from the first capacitor. The system is adapted such that, when the converter is activated and is initiated to start operating or is currently operating, the first switch is in a closed position such that the third capacitor is connected. The system is further adapted such that, when the converter is inactivated and is not in operation, the first switch is in an open position such that the third capacitor is disconnected.

15 Claims, 10 Drawing Sheets

(51) Int. Cl.

| | |
|---|---|
| ***H01M 10/44*** | (2006.01) |
| ***H01M 10/46*** | (2006.01) |
| ***H02J 7/00*** | (2006.01) |
| ***H02J 7/34*** | (2006.01) |
| ***H02J 7/82*** | (2026.01) |
| ***H02M 3/335*** | (2006.01) |

(52) U.S. Cl.
CPC ................ *H02J 7/345* (2013.01); *H02J 7/82* (2026.01); *H02J 7/875* (2026.01); *H02M 3/33576* (2013.01); *H01M 2220/20* (2013.01); *H02J 2207/20* (2020.01)

(58) Field of Classification Search
USPC .......................................................... 320/166
See application file for complete search history.

(56) References Cited

U.S. PATENT DOCUMENTS

| | | | | |
|---|---|---|---|---|
| 2017/0110986 | A1* | 4/2017 | Imura | H02M 1/15 |
| 2019/0341847 | A1* | 11/2019 | Yuzurihara | H02M 1/096 |
| 2020/0186025 | A1 | 6/2020 | Chun | |

FOREIGN PATENT DOCUMENTS

| | | | | | |
|---|---|---|---|---|---|
| JP | 2006027315 | A | * | 2/2006 | |
| JP | 2019092296 | A | * | 6/2019 | |
| WO | WO-2016158133 | A1 | * | 10/2016 | H02K 7/145 |

* cited by examiner

SYSTEM, A CONTROL UNIT AND A METHOD FOR CONTROLLING CAPACITORS IN THE SYSTEM IN AN AT LEAST PARTLY ELECTRICAL DRIVEN VEHICLE

TECHNICAL FIELD

The present disclosure relates generally to a system, a control unit and a method performed by the control unit. More particularly, the present disclosure relates to controlling capacitors in a system in an at least partly electrical driven vehicle.

The invention can be applied in at least partly electrical heavy-duty vehicles, such as trucks, buses, and construction equipment etc. Although the invention will be described with respect to a fully electrified truck, the invention is not restricted to this particular vehicle, but may also be used in other vehicles such as buses, trailers, wheel loaders, articulated haulers, excavators, backhoe loaders, passenger cars, marine vessels etc. It may also be applied in electrical systems of e.g. electrically operated vessels and in various industrial construction machines or working machines. It is applicable in fully electrically operated vehicles as well as in hybrid vehicles, comprising also a combustion engine. The term vehicle will be used herein when referring to any of the vehicle examples above.

The vehicle may be an autonomous vehicle, a partly autonomous vehicle or a manually operated vehicle.

BACKGROUND

The Traction Voltage System (TVS) is the Direct Current (DC) voltage system that connects traction batteries, electric machines, charging systems, compressor drives, DC/DC converters etc. that are involved in the main power conversion processes on board an at least partly electrical driven vehicle. The TVS operates in the range of 600 VDC but varies from system to system depending on battery system but also depending on the State of Charge (SOC) of the vehicle. The power levels of the TVS varies from 5 kW to more than 200 kW with switching frequencies from a few kHz up to almost 100 kHz. Depending on the vehicle, the 600V cables may be in the range from 1 m to more than 20 m in an articulated bus.

There are two different types of currents flowing in a TVS: Common Mode (CM) current and Differential Mode (DM) current.

FIG. 1 is as schematic drawing illustrating the DM current. FIG. 1 shows a power supply 201, a converter 202 and an electric machine 203 comprised in an at least partly electrical driven vehicle. The power supply 201, e.g. a three-phase power supply, may be a battery 205, or any other suitable energy source adapted for supplying electrical power to the vehicle. The power supply 201 comprises a first battery capacitor 204*a* ($C_{CM\_BAT+}$) connected to the positive pole of the battery 205 and a second battery capacitor 204*b* ($C_{CM\_BAT-}$) connected to the negative pole of the battery 205. A first inductor 207*a* (LBAT$_+$) connected to the positive pole of the battery 205 and a second inductor 207*b* ($L_{BAT-}$) connected to the negative pole of the battery 205. The converter 202 comprises an inductive filter 209, e.g. an inductive CM filter ($L_{CM}$) and a converter capacitor 210. The converter 202 comprises a first capacitor 212*a* ($C_{CM\_CONV+}$) and a second capacitor 212*b* ($C_{CM\_CONV-}$) located on opposite sides of a three-phase bridge 211, or it comprises either the first capacitor 212*a* or the second capacitor 212*b*. The term CM capacitor may be used when referring to any of the first capacitor 212*a* and the second capacitor 212*b*. The three-phase bridge 211, also referred to as a three-phase rectifier, is commonly used in high-power applications and is adapted to convert a three-phase DC power supply, e.g. from the power supply 201, into a DC voltage to be used by the electric machine 203. The electric machine 203 comprises a stator or housing.

FIG. 1 shows that the system comprises a first side 200*a*, e.g. a top side, and a second side 200*b*, e.g. a bottom side, which are located on opposite sides of the system. The letters a and b used in reference numbers herein indicates on which side of the three-phase bridge 211 the respective component is located, where letter a indicates a location on the first side 200*a* and the letter b indicates a location on the second side 200*b*. The first side 200*a* and the second side 200*b* may consequently also be used when referring to sides of the three-phase bridge 211 such that the first side 200*a* of the system is the also the first side of the three-phase bridge 211 and the second side 200*b* of the system is also the second side of the three-phase bridge 211. Furthermore, the first side 200*a* and the second side 200*b* may consequently also be used when referring to sides of the converter 202 such that the first side 200*a* of the system is the also the first side of the converter 202 and the second side 200*b* of the system is also the second side of the converter 202.

The terms first side and second side, together with the reference numbers 200*a* and 200*b* will be used herein when referring to the first side and second side of the system and the first side and second side of the three-phase bridge 211.

The arrows illustrated in FIG. 1 represents the DM current. DM current is the wanted current that supports the sources with energy. The DM current flows from the power supply 201, e.g. the battery, to the converter 202 and back to the power supply 201. There may be an un-wanted portion of the DM current as well, which is a superimposed current ripple. This is caused by the switching in the converter 202, i.e. in the three-phase bridge 211. Ground 230 is illustrated with diagonal lines in FIG. 1.

FIG. 2 is as schematic drawing illustrating the CM current. The arrows illustrated in FIG. 2 illustrates the CM current. The CM current is an un-wanted current caused by parasitic capacitance in the TVS. The CM current leaks out via the three parasitic capacitors 220 ($3\times C_{CMwind}$) in the electric machine 203. The parasitic capacitors 220 may be referred to as switched capacitors, switched parasitic capacitors or asymmetrical parasitic capacitors. The CM current flows in the ground plane 230, or shield in the cable, and finally returns back via intentional pole-chassis filter capacitors, i.e. the first capacitor 212*a* ($C_{CM\_CONV+}$), the second capacitor 212*b* ($C_{CM\_CONV-}$), the first battery capacitor 204*a* ($C_{CM\_BAT+}$) and the second battery capacitor 204*b* ($C_{CM\_BAT-}$).

However it is found that the CM current and CM voltage are complicated in that a high frequency discharge of the parasitic capacitors 220 ($3\times C_{CMwind}$) goes back to the first capacitor 212*a* ($C_{CM\_CONV+}$) and the second capacitor 212*b* ($C_{CM\_CONV-}$) and when these two capacitors changes potential a CM current runs in a lower frequency back to the first battery capacitor 204*a* ($C_{CM\_BAT+}$) and the second battery capacitor 204*b* ($C_{CM\_BAT-}$).

The CM current can be divided in the following two different current paths:

CM current caused by the discharge of the parasitic capacitors 220 ($C_{CMwind}$) in the electric machine 203.

CM current caused by the asymmetry of the CM capacitors 212, e.g. one or both of the first capacitor 212*a*, the second capacitors 212*b*, and the parasitic capacitors 220 (3×$C_{CMwind}$).

These two different current paths are illustrated in FIG. 3. The solid arrows represent CM current ($I_{CM\_BAT}$) caused by the asymmetry between the parasitic capacitors 220 (3×$C_{CMwind}$) and the CM capacitance 212. The dotted arrows represent the CM current ($I_{CM\_EM}$) caused by the discharge of the parasitic capacitance 220 ($C_{CMwind}$) in the electric machine 203. The sum of these two CM currents ($I_{CM\_BAT}$ and $I_{CM\_EM}$) may be referred to as the CM current ($I_{CM\_converter}$) for the converter 220:

$$I_{CM\_CONV}=I_{CM\_EM}+I_{CM\_BAT}$$

The CM current ($I_{CM\_EM}$) caused by the discharge of the parasitic capacitance 220 in the electric machine 203 will always flow through the system and cannot be avoided as the parasitic capacitance 220 ($C_{CMwind}$) will alternate between positive and negative poles of the power supply 201.

The converter 202 switches with the 8 combinations (0,0,0), (0,0,1), (0,1,0), (0,1,1),(1,0,0), (1,0,1), (1,1,0) and (1,1,1). Each switching combination will create an unbalance of the CM capacitance as the parasitic capacitances 220 in the electric machine 203 will connect to the positive or negative pole of the power supply 201, i.e. they will change potential from the positive pole 999*a* to the negative 999*b*, or vice versa, of the DC link in the converter 202.

The parasitic capacitors 220 ($C_{CMwind}$) may be used as the switched parasitic capacitance or asymmetrical parasitic capacitance. However, the parasitic capacitors 220 will create an unbalance of capacitance during switching and the parasitic capacitors 220 will be charged/dis-charge during each switching.

Summarized, CM current in the system should be avoided or at least reduced. However there are constraints in the standards that provides a hindrance. Therefore, there is a need to at least mitigate or solve this issue.

SUMMARY

An object of the invention is to provide improved controlling capacitors comprised in an at least partly electrical driven vehicle 100. With the improved control, CM current in the system may be avoided or at least reduced.

According to a first aspect of the invention, the object is achieved by a system controlling capacitors comprised in an at least partly electrical driven vehicle. The system comprises a converter comprising a first capacitor connected to a first side of a three-phase bridge.

The system comprises a third capacitor adapted to be controlled, via a first switch, to be either connected in parallel to or disconnected from the first capacitor. The system is adapted such that, when the converter is activated and is initiated to start operating or is currently operating, the first switch is in a closed position such that the third capacitor is connected. The system is further adapted such that, when the converter is inactivated and is not in operation, the first switch is in an open position such that the third capacitor is disconnected. With the third capacitor, also referred to as an extra CM capacitor, an advantage of that CM currents in the system is avoided or at least reduced is provided.

According to a further embodiment, a first pre-charge circuit may be connected between the third capacitor and the first switch. The first-pre charge circuit is adapted to pre-charge the third capacitor. The first pre-charge circuit may comprise a third switch and a first resistance, or the first pre-charge circuit may comprise at least one semiconductor. An advantage of the first pre-charge circuit may be that it reduces or removes an inrush current. With the reduced or removed inrush current, the lifetime of the components in the system may be increased and also the stability of the system may be increased. This may be advantageous if the system itself cannot handle the inrush current.

According to a further embodiment, the third capacitor may be located at one of the following positions:

1) Inside the converter
2) Outside the converter and with connection to poles of the power supply and after an inductive filter.
3) Outside the converter and with connection to the poles of the power supply and before the inductive filter.

An advantage of position 1) may be that it may minimize a risk for oscillations due to an extra LC circuit that may be formed. Having the third capacitor inside the converter may be a compact solution. An advantage of position 2) may be that is does not require any substantial changes to the converter 202, except that the third capacitor should be connected after the inductive filter. When the third capacitor is located outside the converter, it may be easy to access for example in case of error searching, replacement, or repair of the third capacitor. An advantage of position 3) may be that is does not require any changes to the converter 202. When the third capacitor is located outside the converter, it may be easy to access for example in case of error searching, replacement, or repair of the third capacitor.

According to another embodiment, the converter may comprise a second capacitor connected to a second side of the three-phase bridge which is opposite of the first side. A fourth capacitor may be adapted to be controlled, via a second switch, to be either connected in parallel to or disconnected from the second capacitor. The system may be adapted such that, when the converter is activated and is initiated to start operating or is currently operating, the second switch is in a closed position such that the fourth capacitor may be connected and. The system may be further adapted such that, when the converter is inactivated and is not in operation, the second switch is in an open position such that the fourth capacitor may be disconnected. The third capacitor and the fourth capacitor are located at opposite sides of the system. An advantage of the fourth capacitor may be that the system is symmetrical, i.e. there are capacitances on both the first side and the second side of the system. The capacitances may be seen as a pair. With the symmetry, analysis, fault searching etc. may be easier and faster.

According to a further embodiment, a second pre-charge circuit may be connected between the fourth capacitor and the second switch. The second-pre charge circuit is adapted to pre-charge the fourth capacitor. The second pre-charge circuit may comprise a fourth switch and a second resistance, or the second pre-charge circuit may comprise at least one semiconductor. An advantage of the second pre-charge circuit may be that it reduces or removes an inrush current. With the reduced or removed inrush current, the lifetime of the components in the system may be increased and also the stability of the system may be increased. This may be advantageous if the system itself cannot handle the inrush current. With the second pre-charge circuit, the system becomes symmetrical, i.e. that there are pre-charge circuits on both the first side and the second side of the system. The first pre-charge circuit and the second pre-charge circuit may be seen as a pair. With the symmetry, analysis, fault searching etc. may be easier and faster.

According to a further embodiment, the fourth capacitor may be located at a position on the opposite side that corresponds to the position of the third capacitor. An advantage of this may be that symmetry is obtained. Since the system is symmetrical, the assembly of the system may be easier and less costly.

According to a second aspect of the invention, the object is achieved by a method performed by a control unit for controlling capacitors in a system in an at least partly electrical driven vehicle 100. The system comprises a converter comprising a first capacitor connected to a first side of a three-phase bridge. The system comprises a third capacitor adapted to be controlled, via a first switch, to be either connected in parallel to or disconnected from the first capacitor. The control unit detects that the converter is activated and is initiated to start operating. When it has been detected that the converter is activated and is initiated to start operating, the control unit triggers the first switch to enter a closed position such that third is connected to the first capacitor before the converter starts operating. The control unit detects that the converter is inactivated and is not in operation. When it has been detected that the converter is inactivated and is not in operation, the control unit triggers the first switch to enter an open position such that the third capacitor is disconnected from the first capacitor. Advantages and effects of the second aspect of the invention are similar to the advantages and effects with respect to the other aspects of the invention. It shall also be noted that all embodiments of the other aspects of the invention are applicable to and combinable with all embodiments of the second aspect of the invention and vice versa.

According to a further embodiment, a first pre-charge circuit may be connected between the third capacitor and the first switch. The first pre-charge circuit may be adapted to pre-charge the third capacitor. The first pre-charge circuit may comprise a third switch and a first resistance, or the first pre-charge circuit may comprise at least one semiconductor. After the first switch has been triggered to enter the closed position, the control unit may detect that the third capacitor is charged. When it has been detected that the third capacitor is charged, the control unit may trigger the inactivation of the first pre-charge circuit When it has been detected that the converter is inactivated and is not in operation, the control unit may trigger the activation of the first pre-charge circuit.

According to a further embodiment, the third capacitor may be located at one of the following positions:

1) Inside the converter.
2) Outside the converter and with connection to poles of the power supply and after an inductive filter.
3) Outside the converter and with connection to the poles of the power supply and before the inductive filter.

According to another embodiment, the converter may comprise a second capacitor connected to a second side of the three-phase bridge which is opposite of the first side. A fourth capacitor may be adapted to be controlled, via a second switch to be either connected in parallel to or disconnected from the second capacitor. When it has been detected that the converter is activated and is initiated to start operating, the control unit may trigger the second switch to enter a closed position such that the fourth capacitor is connected to the second capacitor before the converter starts operating. When it has been detected that the converter is inactivated and is not in operation, the control unit may trigger the second switch to enter an open position such that the fourth capacitor is disconnected from the second capacitor.

According to another embodiment, a second pre-charge circuit may be connected between the fourth capacitor and the second switch. The second-pre charge circuit may be adapted to pre-charge the fourth capacitor. The second pre-charge circuit may comprise a fourth switch and a second resistance, or the second pre-charge circuit may comprise at least one semiconductor. After the second switch has been triggered to enter the closed position, the control unit may detect that the fourth capacitor is charged. When it has been detected that the fourth capacitor is charged, the control unit may trigger inactivation of the second pre-charge circuit When it has been detected that the converter is inactivated and is not in operation, the control unit may trigger activation of the second pre-charge circuit.

According to another embodiment, the fourth capacitor may be located at a position on the opposite side that corresponds to the position of the third capacitor.

According to a third aspect of the invention, the object is achieved by a control unit for controlling capacitors in a system in an at least partly electrical driven vehicle. The control unit is adapted to perform a method according to the second aspect. The control unit may be an electronic control unit comprising processing circuitry for performing the method according to the second aspect. The control unit may be a computer. The control unit may comprise hardware or hardware and software. Advantages and effects of the third aspect of the invention are similar to the advantages and effects with respect to the other aspects of the invention. It shall also be noted that all embodiments of the third aspect of the invention are applicable to and combinable with all embodiments of the other aspects of the invention and vice versa.

According to a fourth aspect of the invention, the object is achieved by an at least partly electrically driven vehicle. The at least partly electrically driven vehicle may comprise a control unit according to the third aspect. Advantages and effects of the fourth aspect of the invention are similar to the advantages and effects with respect to the other aspects of the invention. It shall also be noted that all embodiments of the other aspects of the invention are applicable to and combinable with all embodiments of the fourth aspect of the invention and vice versa.

According to a fifth aspect of the invention, the object is achieved by a computer program comprising program code means. The program code means are for performing the steps of the second aspect when the program is run on a computer According to a sixth aspect of the invention, the object is achieved by a computer readable medium. The computer readable medium carries a computer program comprising program code means for performing the steps of the second aspect when the computer program is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 4:
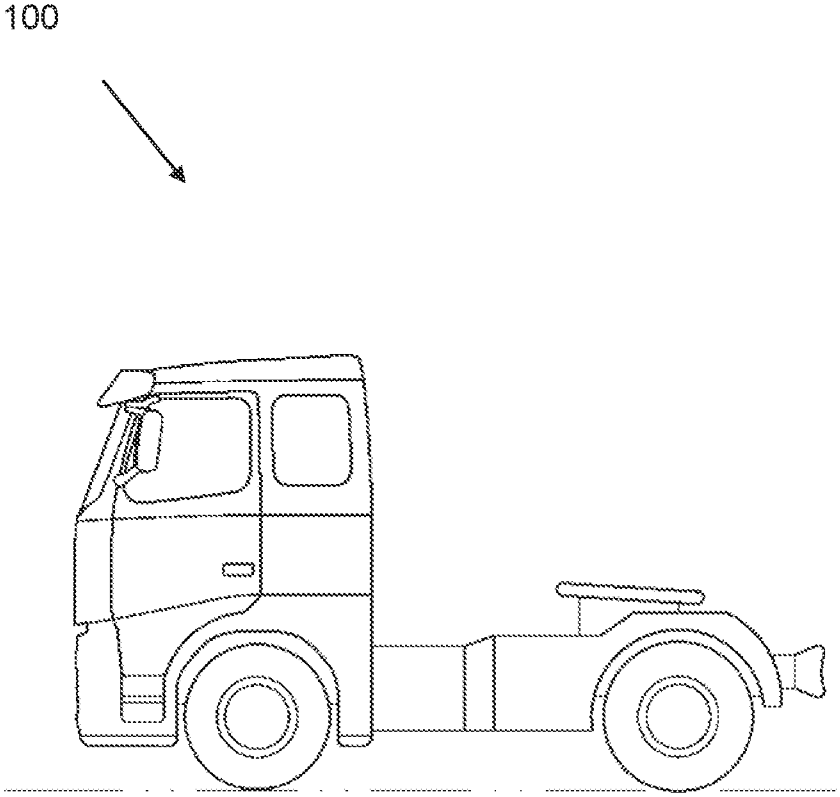
FIG. 4 is a schematic drawing illustrating a vehicle.

FIG. 4 illustrates an at least partly electrically driven vehicle 100. The term vehicle together with the reference number 100 may be used herein for the sake of simplicity when referring to the least partly electrically driven vehicle 100. The at least partly electrically driven vehicle 100 may be fully electrical driven or it may be partly electrical driven. When it is partly electrical driven, also referred to as a hybrid electric vehicle, two types of power are used for driving the vehicle 100 such as an electric machine and a combustion engine.

The vehicle 100 may be a heavy-duty vehicle, such as a truck, bus, construction equipment, trailer, wheel loader, excavator, passenger car, a marine vessel, an electrically operated vessel, a working machine, stationary backup power solution etc., or any other type of vehicle mentioned herein.

As mentioned earlier, CM current in the vehicle 100, e.g. caused by switching in the converter, should be avoided or at least reduced.

Figure 1:
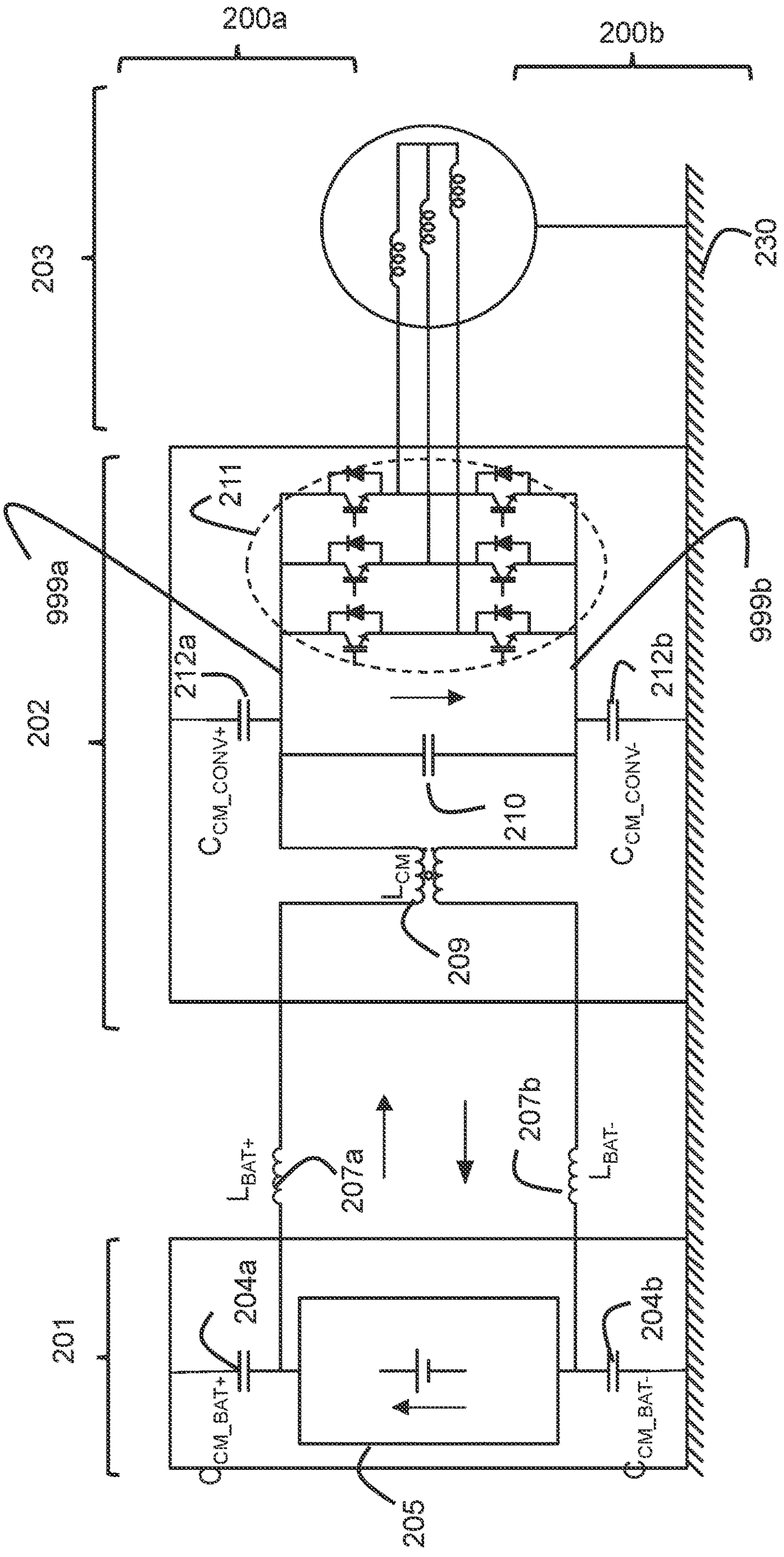
FIG. 1 is a schematic drawing illustrating DM current.
Figure 2:
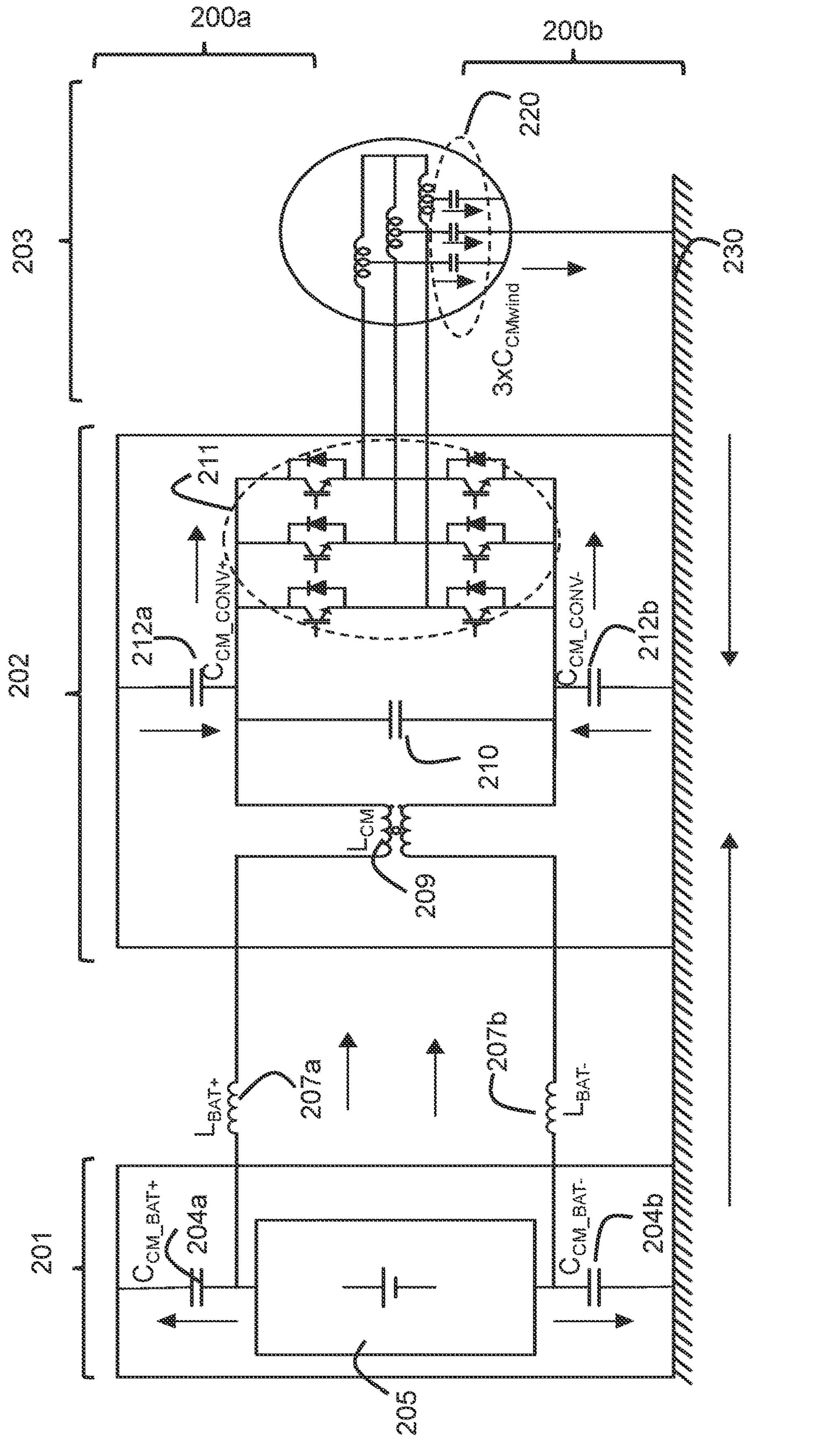
FIG. 2 is a schematic drawing illustrating CM current.
Figure 3:
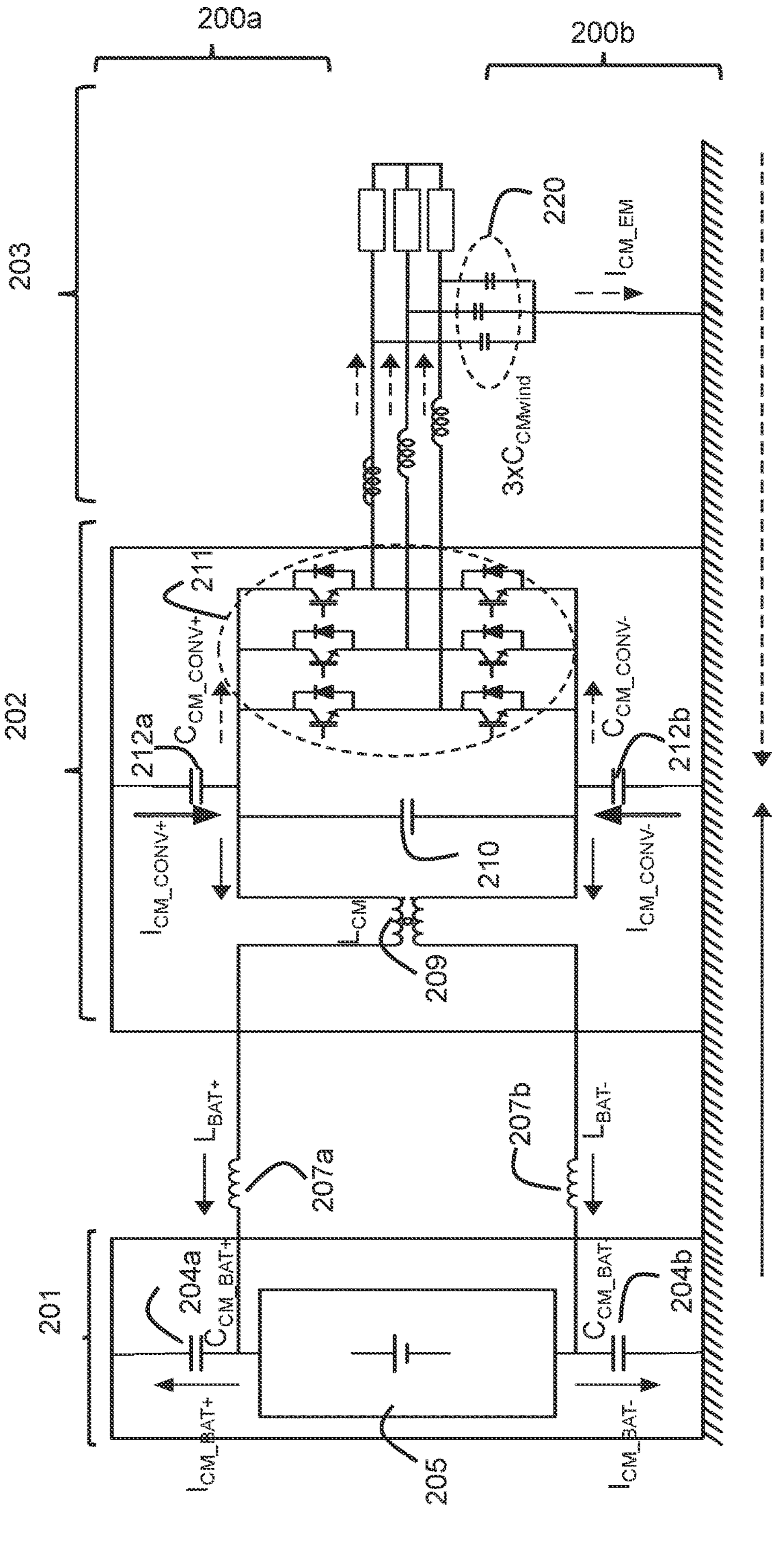
FIG. 3 is a schematic drawing illustrating two different CM currents and paths.

The CM current can be avoided or at least reduced by adding one or two extra CM capacitor(s) in the vehicle 100. The one or two extra CM capacitor(s) are extra with respect to the first capacitor 212*a* and the second capacitor 212*b* as illustrated in FIGS. 1, 2 and 3. In other words, the one or two extra CM capacitor(s) are in addition to the first capacitor 212*a* and the second capacitor 212*b* seen in FIGS. 1, 2, and 3. If the system only comprises the first capacitor 212*a*, i.e. the system does not comprise the second capacitor 212*b*, then the system may comprise only one extra CM capacitor. If the system only comprises the first capacitor 212*a* and the second capacitor 212*b*, then the system may comprise only two extra CM capacitors. If the system comprises two extra capacitors, then one of them are located at the same side as the first capacitor 212*a* and the other is located at the same side as the second capacitor 212*b*, with respect first side 200*a* and the second side 200*b* of the system.

The extra CM capacitor(s) is adapted to be connected to the converter 202 when the converter 202 is activated and is initiated to start operating or is currently operating. The converter 202 is not in operation during charging. Operating refers to that the converter performs a switching operation, that it switches. There may be three alternative ways to mount the extra CM capacitor(s):

1) Inside the converter 202.
2) Outside the converter 202 and with connection to poles of the power supply 201 and after an inductive filter 209.
3) Outside the converter 202 and with connection to the poles of the power supply 201 and before the inductive filter 209.

An advantage of having the extra CM capacitor(s) inside the converter 202, e.g. alternative 1) may be to minimize the risk of oscillations due to an extra LC circuit that is formed.

The extra CM capacitance may be connected via a switch that disconnects the circuit when the converter 202 is not in operation. A pre-charge circuit may be located between the extra CM capacitance and the switch, and this pre-charge circuit may have different designs which will be described in more detail with reference to FIG. 8. The pre-charge circuit is adapted to pre-charge the extra CM capacitance. The pre-charge circuit is adapted to enable charging of the extra CM capacitance to be done in a controlled fashion. The pre-charge circuit may reduce a peak current from the power supply. With the pre-charge circuit, inrush current during power up of the system may be removed or at least reduced, which may increase the lifetime of the components in the system. The pre-charge circuit, if present, may be activated or enabled at start of the method, e.g. it may be activated or enabled as default.

The system for controlling capacitors comprised in an at least partly electrical driven vehicle 100, comprises a converter 202. The converter 202 comprises the first capacitor 212*a* connected to a first side 200*a* of a three-phase bridge 211. The letter a in the reference number 212*a* indicates that the first capacitor 212*a* is located on the first side 200*a* of the system.

The converter 202 may comprise a second capacitor 212*b* connected to a second side of the three-phase bridge 211 which is opposite of the first side.

The system comprises a third capacitor 213*a*_1, 213*a*_2, 213*a*_3 adapted to be controlled, via a first switch 216*a*, to be either connected in parallel to or disconnected from the first capacitor 212*a*. The third capacitor 213*a*_1, 213*a*_2, 213*a*_3 is the extra CM capacitance mentioned above. The letter a in the reference numbers associated with the third capacitor 213*a*_1, 213*a*_2, 213*a*_3 indicates that it is located on the first side 200*a* of the system, and the numbers after the underscore indicates the alternative location of the extra CM capacitor as listed previously. The letter a in the reference number 216*a* for the first switch indicates that the first switch 216*a* is located on the first side 200*a* of the system. The third capacitor 213*a*_1, 213*a*_2, 213*a*_3 may be a third CM capacitor 213*a*_1, 213*a*_2, 213*a*_3. The third capacitor 213*a*_1, 213*a*_2, 213*a*_3 may be adapted to be connected between a power supply 201 and an electric machine 203.

The system is adapted such that, when the first switch 216*a* is in a closed position, then the third capacitor 213*a*_1, 213*a*_2, 213*a*_3 is connected. A precondition for the first switch 216*a* to be connected may be that the converter 202 is activated and is initiated to start operating or is currently operating. The system is adapted such that, when the first switch 216*a* is in an open position, then the third capacitor 213*a*_1, 213*a*_2, 213*a*_3 is disconnected. A precondition for the first switch 216*a* to be disconnected may be that the converter 202 is inactivated and is not in operation.

The system may comprise a fourth capacitor 213*b*_1, 213*b*_2, 213*b*_3 which may be adapted to be controlled, via a second switch 216*b*, to be either connected in parallel to or disconnected from the second capacitor 212*b*. The fourth capacitor 213*b*_1, 213*b*_2, 213*b*_is the extra CM capacitance mentioned above. The letter b in the reference numbers associated with the fourth capacitor 213*b*_1, 213*b*_2, 213*b*_3 indicates that it is located on the second side 200*b* of the system, and the numbers after the underscore indicates the alternative location of the extra CM capacitor as listed previously. The letter b in the reference number 216*b* for the second switch indicates that the second switch 216*b* is located on the second side 200*b* of the system. The fourth capacitor 213*b*_1, 213*b*_2, 213*b*_3 may be a fourth CM capacitor 213*b*_1, 213*b*_2, 213*b*_3. The fourth capacitor

213*b*_1, 213*b*_2, 213*b*_3 may be adapted to be connected between a power supply 201 and an electric machine 203.

The system is adapted such that, when the second switch 216*b* is in a closed position, then the fourth capacitor 213*b*_1, 213*b*_2, 213*b*_3 is connected. A precondition for the second switch 216*b* to be connected may be that the converter 202 is activated and is initiated to start operating or is currently operating. The system is adapted such that, when the second switch 216*b* is in an open position, then the fourth capacitor 213*b*_1, 213*b*_2, 213*b*_3 is disconnected. A precondition for the second switch 216*b* to be disconnected may be that the converter 202 is inactivated and is not in operation.

The third capacitor 213*a*_1, 213*a*_2, 213*a*_3 and the fourth capacitor 213*b*_1, 213*b*_2, 213*b*_3 may be located at opposite sides of the system, e.g. the first side 200*a* and the second side 200*b*. This may also be described as the third capacitor 213*a*_1, 213*a*_2, 213*a*_3 and the fourth capacitor 213*b*_1, 213*b*_2, 213*b*_3 may be located at opposite sides of the system, e.g. the first side 200*a* and the second side 200*b*.

Figure 9:
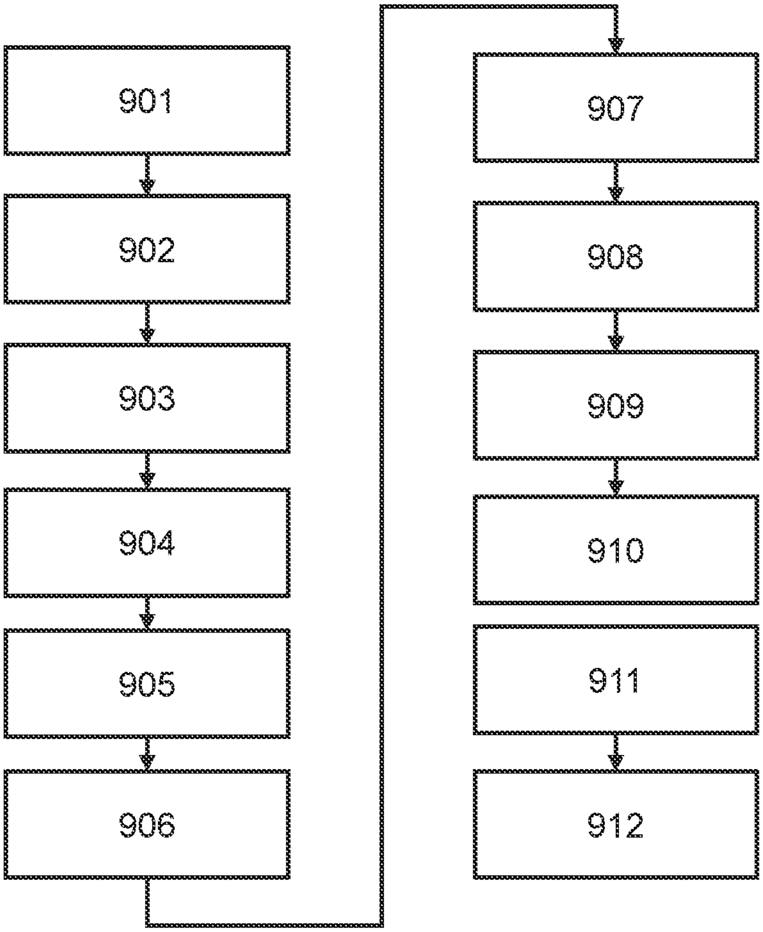
FIG. 9 is a flow chart illustrating a method.
Figure 10:
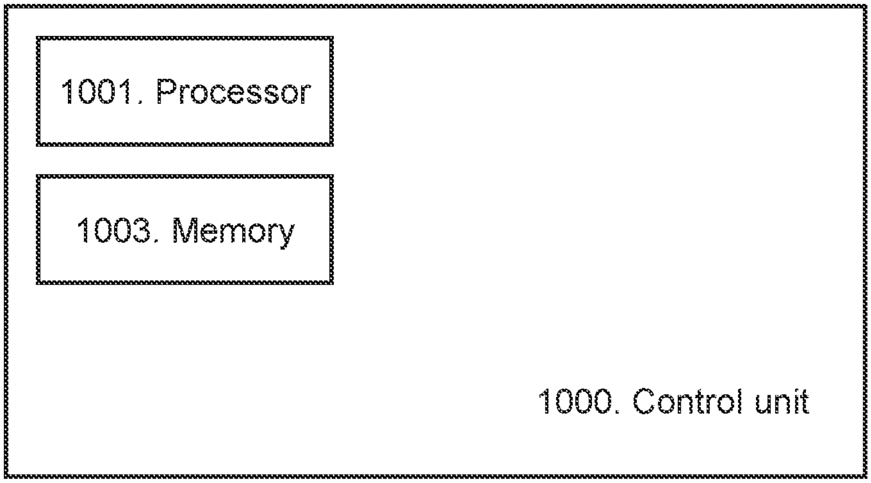
FIG. 10 is a schematic block diagram illustrating a control unit.

The first switch 216*a* and the second switch 216*b* may be adapted to be controlled by a control unit 1000, see e.g. FIG. 9 and FIG. 10. The control unit 1000 will be described in more detail later. The first switch 216*a* and the second switch 216*b* may be any suitable type of switch, e.g. a relay, a semiconductor etc.

Thus, the system comprises the converter 202 which comprises a first capacitor 212*a*. The system further comprises the third capacitor 213*a*_1, 213*a*_2, 213*a*_3 adapted to be controlled to be either connected in parallel to or disconnected from the first capacitor 212*a*. If the system is symmetrical with respect to the first side 200*a* and second side 200*b* such that the converter 202 comprises a second capacitor 212*b* located on the opposite side of the three-phase bridge 211 in relation to the first capacitor 212*a*, then the system may comprise the fourth capacitor 213*b*_1, 213*b*_2, 213*b*_3. The fourth capacitor 213*b*_1, 213*b*_2, 213*b*_3 may then be located at the opposite side of the system in relation to the third capacitor 213*a*_1, 213*a*_2, 213*a*_3.

The three alternative ways of mounting the extra CM capacitor, i.e. the third capacitor 213*a*_1, 213*a*_2, 213*a*_3 and/or the fourth capacitor 213*b*_1, 213*b*_2, 213*b*_3 will now be described in more detail.

Figure 5:
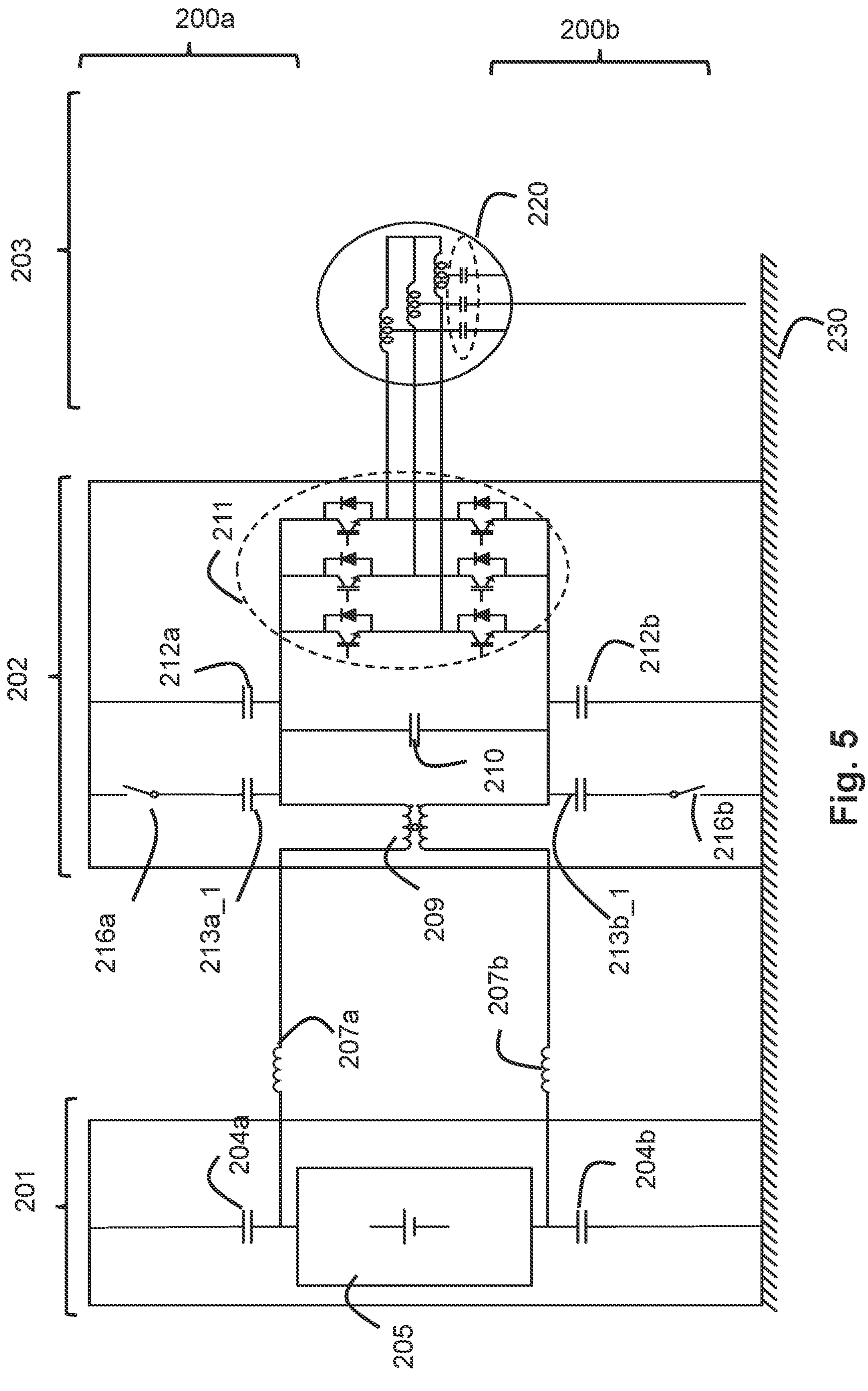
FIG. 5 is a schematic drawing illustrating a system.

FIG. 5 is a schematic drawing illustrating alternative 1) where the extra CM capacitor is located inside the converter 202, i.e. the third capacitor 213*a*_1, 213*a*_2, 213*a*_3 and/or fourth capacitor 213*b*_1, 213*b*_2, 213*b*_3. Note that FIG. 5 illustrates both the third capacitor 213*a*_1, 213*a*_2, 213*a*_3 and fourth capacitor 213*b*_1, 213*b*_2, 213*b*_3, but the system may not necessarily comprise both those capacitors. The system may comprise only one of the third capacitor 213*a*_1, 213*a*_2, 213*a*_3 and fourth capacitor 213*b*_1, 213*b*_2, 213*b*_3, or it may comprise both the third capacitor 213*a*_1, 213*a*_2, 213*a*_3 and the fourth capacitor 213*b*_1, 213*b*_2, 213*b*_3.

As illustrated in FIG. 5, the third capacitor 213*a*_1, 213*a*_2, 213*a*_3 is connected in series with the first switch 216*a*. Via the first switch 216*a*, the third capacitor 213*a*_1, 213*a*_2, 213*a*_3 is adapted to be controlled to be either connected in parallel to or disconnected from the first capacitor 212*a*. The first switch 216*a* is adapted to be controlled, wirelessly or via a wire, by a control unit 1000 which may be located at any suitable location in the system shown in FIG. 5.

As also illustrated in FIG. 5, the fourth capacitor 213*b*_1, 213*b*_2, 213*b*_3 is connected in series with the second switch 216*b*. Via the second switch 216*b*, the fourth capacitor 213*b*_1, 213*b*_2, 213*b*_3 is adapted to be controlled to be either connected in parallel to or disconnected from the second capacitor 212*b*. The second switch 216*b* may be adapted to be controlled, wirelessly or via a wire, by the control unit 1000. The first switch 216*a* is adapted to change from a closed position to an open position at substantially the same time, with some tolerance, as the second switch 216*b* changes from a closed position to the open position, and similarly from the change from the open position to the closed position.

The other components of the system illustrated in FIG. 5 will not be described in more detail, but reference is made to FIGS. 1, 2 and 3 for more details regarding them.

Note that the conductor 202 may or may not comprise the inductive filter 209.

Figure 6:
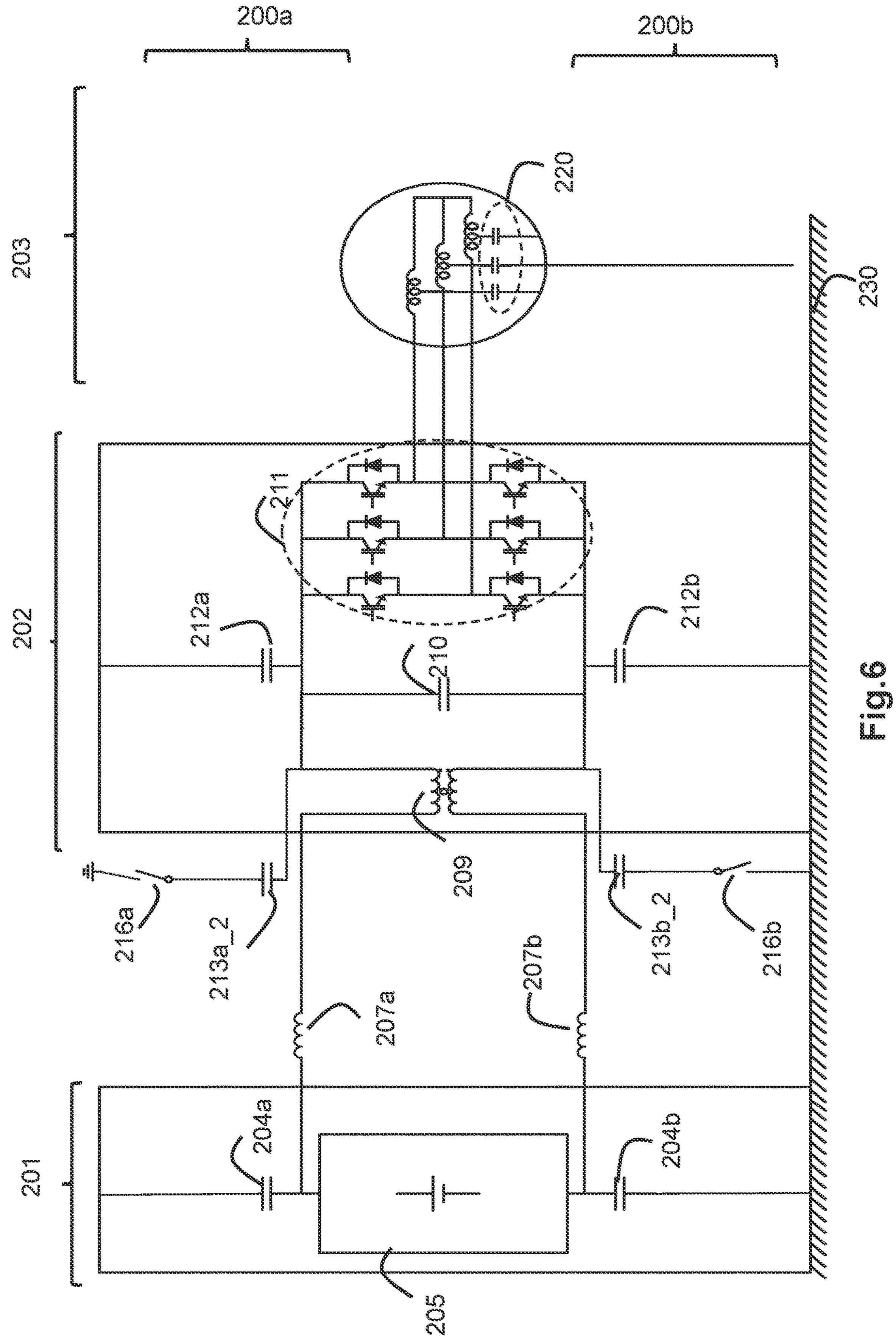
FIG. 6 is a schematic drawing illustrating a system.

FIG. 6 is a schematic drawing illustrating alternative 2) where the extra CM capacitor is located outside the converter 202 and with connection to poles of the power supply 201 and after the inductive filter 209. The term after the inductive filter 209 refers to in the direction towards the electric machine 203. The inductive filter 209 may be comprised in the conductor 202. The inductive filter 209 may be an inductive CM filter or a combined inductive CM and DM filter. The extra CM capacitor is located between the power supply 201 and the converter 202. The extra CM capacitor is located outside the converter 202, but the connection is inside the converter 202 at a location after the inductive filter 209. Note that FIG. 6 illustrates both the third capacitor 213*a*_1, 213*a*_2, 213*a*_3 and fourth capacitor 213*b*_1, 213*b*_2, 213*b*_3, but the system may not necessarily comprise both those capacitors. The system may comprise only one of the third capacitor 213*a*_1, 213*a*_2, 213*a*_3 and fourth capacitor 213*b*_1, 213*b*_2, 213*b*_3, or it may comprise both the third capacitor 213*a*_1, 213*a*_2, 213*a*_3 and the fourth capacitor 213*b*_1, 213*b*_2, 213*b*_3.

As illustrated in FIG. 6, the third capacitor 213*a*_1, 213*a*_2, 213*a*_3 is connected in series with the first switch 216*a*. The first switch 216*a* may be connected to earth ground in the end that is not connected to the third capacitor 213*a*_1, 213*a*_2, 213*a*_3. Via the first switch 216*a*, the third capacitor 213*a*_1, 213*a*_2, 213*a*_3 is adapted to be controlled to be either connected in parallel to or disconnected from the first capacitor 212*a*. The first switch 216*a* is adapted to be controlled, wirelessly or via a wire, by a control unit 1000 which may be located at any suitable location in the system shown in FIG. 6.

As also illustrated in FIG. 6, the fourth capacitor 213*b*_1, 213*b*_2, 213*b*_3 is connected in series with the second switch 216*b*. Via the second switch 216*b*, the fourth capacitor 213*b*_1, 213*b*_2, 213*b*_3 is adapted to be controlled to be either connected in parallel to or disconnected from the second capacitor 212*b*. The second switch 216*b* may be adapted to be controlled, wirelessly or via a wire, by the control unit 1000. The first switch 216*a* is adapted to change from a closed position to an open position at substantially the same time, with some tolerance, as the second switch 216*b* changes from a closed position to the open position, and similarly from the change from the open position to the closed position.

The other components of the system illustrated in FIG. 6 will not be described in more detail, but reference is made to FIGS. 1, 2 and 3 for more details regarding them.

Figure 7:
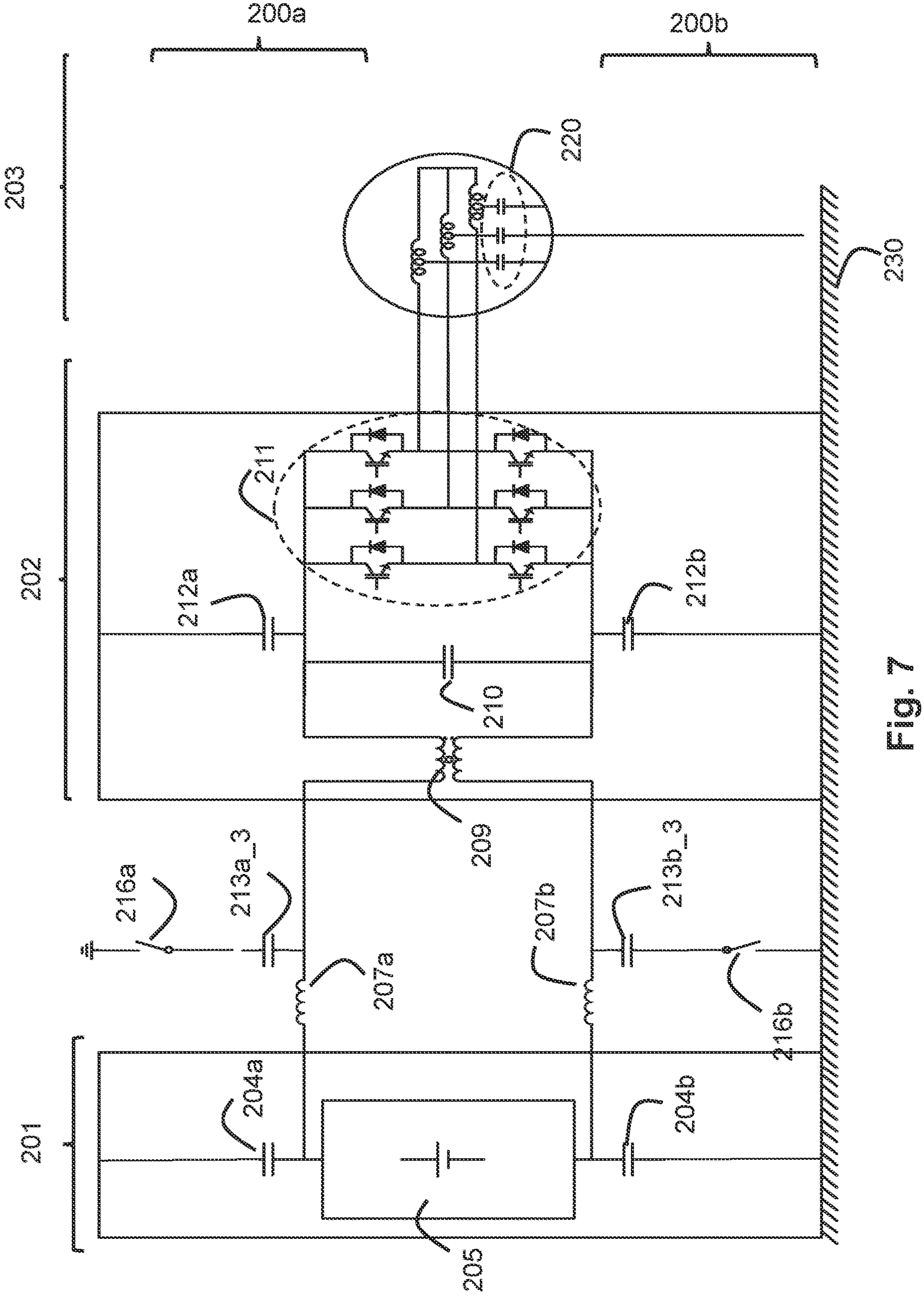
FIG. 7 is a schematic drawing illustrating a system.

FIG. 7 is a schematic drawing illustrating alternative 2) where the extra CM capacitor is located outside the converter 202 and with connection to the poles of the power supply 201 and before the inductive filter 209. A difference between the location in FIG. 6 and FIG. 7 is therefore that the extra CM capacitor is located after the inductive filter 209 in FIG. 6 and before the inductive filter 209 in FIG. 7. The term before the inductive filter 209 refers to in the direction towards the electric machine 203. The inductive filter 209 may be comprised in the conductor 202. The inductive filter 209 may be an inductive CM filter or a combined inductive CM and DM filter. The extra CM capacitor is located between the power supply 201 and the converter 202. The extra CM capacitor is located outside the converter 202, but the connection is inside the converter 202 at a location after the inductive filter 209. Note that FIG. 7 illustrates both the third capacitor 213*a*_1, 213*a*_2, 213*a*_3 and fourth capacitor 213*b*_1, 213*b*_2, 213*b*_3, but the system may not necessarily comprise both those capacitors. The system may comprise only one of the third capacitor 213*a*_1, 213*a*_2, 213*a*_3 and fourth capacitor 213*b*_1, 213*b*_2, 213*b*_3, or it may comprise both the third capacitor 213*a*_1, 213*a*_2, 213*a*_3 and the fourth capacitor 213*b*_1, 213*b*_2, 213*b*_3.

As illustrated in FIG. 7, the third capacitor 213*a*_1, 213*a*_2, 213*a*_3 is connected in series with the first switch 216*a*. The first switch 216*a* may be connected to earth ground in the end that is not connected to the third capacitor 213*a*_1, 213*a*_2, 213*a*_3. Via the first switch 216*a*, the third capacitor 213*a*_1, 213*a*_2, 213*a*_3 is adapted to be controlled to be either connected in parallel to or disconnected from the first capacitor 212*a*. The first switch 216*a* is adapted to be controlled, wirelessly or via a wire, by a control unit 1000 which may be located at any suitable location in the system shown in FIG. 7.

As also illustrated in FIG. 7, the fourth capacitor 213*b*_1, 213*b*_2, 213*b*_3 is connected in series with the second switch 216*b*. Via the second switch 216*b*, the fourth capacitor 213*b*_1, 213*b*_2, 213*b*_3 is adapted to be controlled to be either connected in parallel to or disconnected from the second capacitor 212*b*. The second switch 216*b* may be adapted to be controlled, wirelessly or via a wire, by the control unit 1000. The first switch 216*a* is adapted to change from a closed position to an open position at substantially the same time, with some tolerance, as the second switch 216*b* changes from a closed position to the open position, and similarly from the change from the open position to the closed position.

The other components of the system illustrated in FIG. 7 will not be described in more detail, but reference is made to FIGS. 1, 2 and 3 for more details regarding them.

Figure 8A:
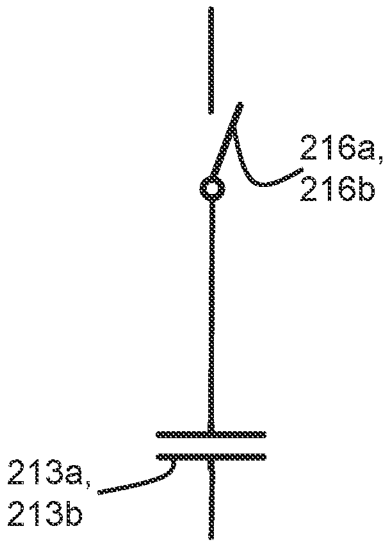
FIG. 8*a*-8*b* are schematic drawing illustrating a pre-charge circuit.

As mentioned above, the third capacitor 213*a*_1, 213*a*_2, 213*a*_3 is adapted to be controlled via the first switch 216*a* and the fourth capacitor 213*b*_1, 213*b*_2, 213*b*_3 may be adapted to be controlled via the second switch 216*b*. This is illustrated in FIG. 8*a*. FIG. 8*a* is an illustration that shows the extra CM capacitor and the controlling switch, regardless of if it is the third capacitor 213*a*_1, 213*a*_2, 213*a*_3 and the first switch 216*a* or the fourth capacitor 213*b*_1, 213*b*_2, 213*b*_3 and the second switch 216*b*. Thus, there is no pre-charge circuit in FIG. 8*a*. If there is no pre-charge circuit present, then the system comprises fewer components, which reduces the risk for component failure, it reduces the complexity and cost of the system.

If the system comprises a pre-charge circuit, then this pre-charge circuit may comprise any suitable component(s) which together are adapted to pre-charge the extra CM conductor. The pre-charging may be on, activated or enabled as default, i.e. at start of a method. After the extra CM conductor has been charged, the pre-charge circuit maybe turned off, inactivated or disabled.

Figure 8B:
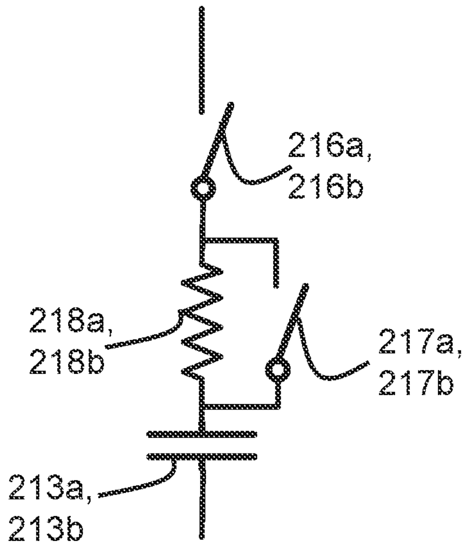

FIG. 8*b* illustrates one example of a pre-charge circuit that may be connected between the extra CM capacitor and the controlling switch. The pre-charge circuit may comprise a switch and a resistance. There may be a first pre-charge circuit connected between the third capacitor 213*a*_1, 213*a*_2, 213*a*_3 and the first switch 216*a*. There may be a second pre-charge circuit connected between the fourth capacitor 213*b*_1, 213*b*_2, 213*b*_3 and the second switch 216*b*. The first pre-charge circuit may comprise a third switch 217*a* and a first resistance 218*a*. The second pre-charge circuit may comprise a fourth switch 217*b* and a second resistance 218*b*. FIG. 8*b* shows any of the first pre-charge circuit and the second pre-charge circuit. If there is a first pre-charge circuit connected between the third capacitor 213*a*_1, 213*a*_2, 213*a*_3 and the first switch 216*a*, then there may be a second pre-charge circuit connected between the fourth capacitor 213*b*_1, 213*b*_2, 213*b*_3 and the second switch 216*b*.

When the control unit 100 has detected that the converter 202 is about to start switching, the first switch 216*a* and possible also the second switch 216*b*, if present in the system, are triggered to enter the closed position. When the third capacitor 213*a*_1, 213*a*_2, 213*a*_3 and possibly also the fourth capacitor 213*b*_1, 213*b*_2, 213*b*_3, if present in the system, are charged, then the third switch 217*a* and possibly also the fourth switch 217*b*, if present in the system, enters the closed position. When the converter 202 has stopped switching, then the first switch 216*a* and the third switch 217*a*, and possibly also the second switch 216*b* and the fourth switch 217*b*, if present in the system, enters the open positioned.

An alternative to the pre-charge circuit exemplified in FIG. 8*b* may be that the pre-charge comprises at least one semiconductor which is adapted to pre-charge the extra CM capacitor.

FIG. 9 illustrates a method performed by the control unit 1000 for controlling capacitors in a system in an at least partly electrical driven vehicle 100. The system comprises a converter 202 comprising a first capacitor 212*a* connected to a first side of a three-phase bridge 211. The system comprises a third capacitor 213*a*_1, 213*a*_2, 213*a*_3 adapted to be controlled, via a first switch 216*a*, to be either connected in parallel to or disconnected from the first capacitor 212*a*.

The third capacitor 213*a*_1, 213*a*_2, 213*a*_3 may be located at one of the following positions:

4) Inside the converter 202.
5) Outside the converter 202 and with connection to poles of the power supply 201 and after an inductive filter 209.
6) Outside the converter 202 and with connection to the poles of the power supply 201) and before the inductive filter 209.

A first pre-charge circuit may be connected between the third capacitor 213*a*_1, 213*a*_2, 213*a*_3 and the first switch 216*a*. The first pre-charge circuit may comprise a third switch 217*a* and a first resistance 218*a*, or the first pre-charge circuit may comprise at least one semiconductor, or it may comprise any other suitable components adapted for pre-charging.

The converter 202 may comprise a second capacitor 212*b* connected to a second side of the three-phase bridge 211 which is opposite of the first side. The fourth capacitor 213*b*_1, 213*b*_2, 213*b*_3 may be adapted to be controlled, via the second switch 216*b*, to be either connected in parallel to or disconnected from the second capacitor 212*b*.

The fourth capacitor 213*b*_1, 213*b*_2, 213*b*_3 may be located at a position on the opposite side that corresponds to the position of the third capacitor 213*a*_1, 213*a*_2, 213*a*_3.

A second pre-charge circuit may be connected between the fourth capacitor 213*b*_1, 213*b*_2, 213*b*_3 and the second switch 216*b*. The second pre-charge circuit may comprise a fourth switch 217*b* and a second resistance 218*b*, or the second pre-charge circuit may comprise at least one semiconductor, or the second pre-charge circuit may comprise any other suitable component(s) adapted for pre-charging.

The method comprises at least one of the following steps, which steps may be performed in any suitable order than described below:

Step 901

The control unit 1000 detects that the converter 202 is activated and is initiated to start operating, i.e. that is initiated to start switching.

Step 902

When it has been detected that the converter 202 is activated and is initiated to start operating, the control unit 1000 triggers the first switch 216*a* to enter a closed position such that third capacitor 213*a*_1, 213*a*_2, 213*a*_3 is connected to the first capacitor 212*a* before the converter 202 starts operating, i.e. switching.

The triggering may comprise that the control unit 1000 sends an instruction, a signal, a request etc. upon which the first switch 216*a* responds.

The first switch 216*a* may enter the closed position when it has been triggered, i.e. as a response of the triggering.

When the first switch 216*a* has entered the closed position, the converter 202 may start switching and the charging of the third capacitor 213*a*_1, 213*a*_2, 213*a*_3 may start.

Step 903

This step may be performed if the first pre-charge circuit is connected between the third capacitor 213*a*_1, 213*a*_2, 213*a*_3 and the first switch 216*a*. The first pre-charge circuit may be described as being on, activated or enabled at start of the method.

After the first switch 216*a* has been triggered to enter the closed position, the control unit 1000 may detect that the third capacitor 213*a*_1, 213*a*_2, 213*a*_3 is charged. The third capacitor 213*a*_1, 213*a*_2, 213*a*_3 may be fully charged, or it may be charged up to a predetermined level. The speed of the charging may be faster if there is no pre-charge circuit between the third capacitor 213*a*_1, 213*a*_2, 213*a*_3 and the first switch 216*a*, as compared to if a pre-charge circuit is present. If there is a pre-charge circuit between the third capacitor 213*a*_1, 213*a*_2, 213*a*_3 and the first switch 216*a*, then the charging of the third capacitor 213*a*_1, 213*a*_2, 213*a*_3 may be performed in a slower fashion and in a controlled fashion.

The control unit 1000 may detect that the third capacitor 213*a*_1, 213*a*_2, 213*a*_3 is charged by monitoring the charging level of the third capacitor 213*a*_1, 213*a*_2, 213*a*_3. The monitoring may be performed continuously, at regular or irregular time intervals, upon request etc. The control unit 1000 may detect that the third capacitor 213*a*_1, 213*a*_2, 213*a*_3 is charged by receiving information indicating the charging level of the third capacitor 213*a*_1, 213*a*_2, 213*a*_3 from the third capacitor 213*a*_1, 213*a*_2, 213*a*_3 itself or from any other unit that is adapted to obtain information indicating the charging level of the third capacitor 213*a*_1, 213*a*_2, 213*a*_3.

Step 904

When it has been detected that the third capacitor 213*a*_1, 213*a*_2, 213*a*_3 is charged, the control unit 1000 may trigger disabling, inactivation or turning off the first pre-charge circuit.

For example, the control unit 1000 may trigger the third switch 217*a* comprised in the first pre-charge circuit to enter a closed position, i.e. to change from being in an open position to a closed position. The triggering may comprise that the control unit 1000 sends an instruction, a signal, a request etc. upon which the third switch 217*a* responds.

The third switch 217*a* may enter the closed position when it has been triggered, i.e. as a response of the triggering.

If the first pre-charge circuit comprises at least one semiconductor instead of the third switch 217*a* and the resistor 218*a*, then the at least one semiconductor may be triggered to be disabled, inactivated or turned off in step 904.

Step 905

This step may be performed when the converter 202 comprise a second capacitor 212*b* and when the system comprises the fourth capacitor 213*b*_1, 213*b*_2, 213*b*_3.

When it has been detected that the converter 202 is activated and is initiated to start operating, the control unit 1000 may trigger the second switch 216*b* to enter a closed position such that the fourth capacitor 213*b*_1, 213*b*_2, 213*b*_3 is connected to the second capacitor 212*b* before the converter 202 starts operating, i.e. before it starts switching.

The triggering may comprise that the control unit 1000 sends an instruction, a signal, a request etc. upon which the second switch 216*b* responds.

The second switch 216*b* may enter the closed position when it has been triggered, i.e. as a response of the triggering.

When the second switch 216*b* has entered the closed position, the converter 202 may start switching and the charging of the fourth capacitor 213*b*_1, 213*b*_2, 213*b*_3 may start.

Step 906

This step may be performed if the second pre-charge circuit is connected between the fourth capacitor 213*b*_1, 213*b*_2, 213*b*_3 and the second switch 216*b*. The second pre-charge circuit may be described as being on, activated or enabled at start of the method. After the second switch 216*b* has been triggered to enter the closed position, the control unit 1000 may detect that the fourth capacitor 213*b*_1, 213*b*_2, 213*b*_3 is charged. The fourth capacitor 213*b*_1, 213*b*_2, 213*b*_3 may be fully charged, or it may be charged up to a predetermined level. The speed of the charging may be faster if there is no second pre-charge circuit between the fourth capacitor 213*b*_1, 213*b*_2, 213*b*_3 and the second switch 216*b*, as compared to if a second pre-charge circuit is present. If there is a pre-charge circuit between the fourth capacitor 213*b*_1, 213*b*_2, 213*b*_3 and the second switch 216*b*, then the charging of the fourth capacitor 213*b*_1, 213*b*_2, 213*b*_3 may be performed in a slower fashion and in a controlled fashion.

The control unit 1000 may detect that the fourth capacitor 213*b*_1, 213*b*_2, 213*b*_3 is charged by monitoring the charging level of the fourth capacitor 213*b*_1, 213*b*_2, 213*b*_3. The monitoring may be performed continuously, at regular or irregular time intervals, upon request etc. The control unit 1000 may detect that the fourth capacitor 213*b*_1, 213*b*_2, 213*b*_3 is charged by receiving information indicating the charging level of the fourth capacitor 213*b*_1, 213*b*_2, 213*b*_3 from the fourth capacitor 213*b*_1, 213*b*_2, 213*b*_3 itself or from any other unit that is adapted to obtain information indicating the charging level of the fourth capacitor 213*b*_1, 213*b*_2, 213*b*_3.

Step 907

When it has been detected that the fourth capacitor 213*b*_1, 213*b*_2, 213*b*_3 is charged, the control unit 1000 may trigger disabling, inactivation or turning off the second pre-charge circuit.

For example, the control unit 1000 may trigger the fourth switch 217*b* comprised in the second pre-charge circuit to enter a closed position, i.e. to change from the open position to the closed position.

The triggering may comprise that the control unit 1000 sends an instruction, a signal, a request etc. upon which the fourth switch 217*b* responds. The fourth switch 217*b* may enter the closed position when it has been triggered, i.e. as a response of the triggering.

After at least the first switch 216*sa* has entered the closed position, the converter 202 may start to switch. After at converter 202 has stopped switching, at least the first switch 216*a* enters the open position.

If the second pre-charge circuit comprises at least one semiconductor instead of the fourth switch 217*b* and the resistor 218*b*, then the at least one semiconductor may be triggered to be disabled, inactivated or turned off in step 907.

Step 908

The control unit 1000 detects that the converter 202 is inactivated and is not in operation, i.e. that the converter 202 is not switching, that it has stopped switching.

Step 909

When it has been detected that the converter 202 is inactivated and is not in operation, the control unit 1000 triggers the first switch 216 to enter an open position such that the third capacitor is disconnected from the first capacitor 212*a*.

The triggering may comprise that the control unit 1000 sends an instruction, a signal, a request etc. upon which the first switch 216*a* responds.

The first switch 216*a* may enter the open position when it has been triggered, i.e. as a response of the triggering.

Step 910

This step may be performed if the first pre-charge circuit is connected between the third capacitor 213*a*_1, 213*a*_2, 213*a*_3 and the first switch 216*a*.

When it has been detected that the converter 202 is inactivated and is not in operation, the control unit 1000 may trigger the first pre-charge circuit to be enabled, activated or turned on. For example, the control unit 100 may trigger the third switch 217*a* comprised in the first pre-charge circuit to enter an open position, e.g. to change from a closed position to an open position.

The triggering may comprise that the control unit 1000 sends an instruction, a signal, a request etc. upon which the third switch 217*a* responds.

The third switch 217*a* may enter the open position when it has been triggered, i.e. as a response of the triggering.

If the first pre-charge circuit comprises at least one semiconductor instead of the third switch 217*a* and the resistor 218*a*, then the at least one semiconductor may be triggered to be enabled, activated or turned on in step 910.

Step 911

This step may be performed when the converter 202 comprise a second capacitor 212*b* and when the system comprises the fourth capacitor 213*b*_1, 213*b*_2, 213*b*_3.

When it has been detected that the converter 202 is inactivated and is not in operation, the control unit 1000 may trigger the second switch 216*b* to enter an open position such that the fourth capacitor 213*b*_1, 213*b*_2, 213*b*_3 is disconnected from the second capacitor 212*b*, e.g. to change from a closed position to an open position.

The triggering may comprise that the control unit 1000 sends an instruction, a signal, a request etc. upon which the second switch 216*b* responds.

The second switch 216*b* may enter the open position when it has been triggered, i.e. as a response of the triggering.

Step 912

This step may be performed if the second pre-charge circuit is connected between the fourth capacitor 213*b*_1, 213*b*_2, 213*b*_3 and the second switch 216*b*.

When it has been detected that the converter 202 is inactivated and is not in operation, the control unit 1000 may trigger the second pre-charge circuit to be enabled, activated or turned on. For example, the control unit 1000 may trigger the fourth switch 217*b* to enter an open position e.g. to change from a closed position to an open position.

The triggering may comprise that the control unit 1000 sends an instruction, a signal, a request etc. upon which the fourth switch 217*b* responds.

The fourth switch 217*b* may enter the open position when it has been triggered, i.e. as a response of the triggering.

If the second pre-charge circuit comprises at least one semiconductor instead of the fourth switch 217*b* and the resistor 218*b*, then the at least one semiconductor may be triggered to be enabled, activated or turned on in step 912.

FIG. 7 illustrates that the control unit 1000. The control unit 100 may be comprised in the vehicle 100 or it may be adapted to communicate with the vehicle 100, and consequently the system. The control unit 1000 is adapted to control components, systems and subsystems in the vehicle 100. The control unit 1000 is adapted to be connected to one or more switches, e.g. the first switch 216*a*, the second switch 216*b*. Thus, the control unit 1000 is common for all switches. The control unit 1000 may be an electronic control unit comprising processing circuitry, e.g. the processor 10001, for performing the method described herein. The control unit 1000 may comprise a memory 1003. The memory 1003 comprises instructions executable by the processor 1001. The control unit 1000 may be a computer. The control unit 1000 may comprise hardware or hardware and software.

The control unit 1000 for controlling capacitors in a system in an at least partly electrical driven vehicle 100 is adapted to perform a method as described herein.

A computer program may comprise program code means for performing the method described herein when the program is run on a computer. The computer program may be stored on the memory 1003 and executed by the processor 1001. The method may instead be hardware controlled without a computer.

A computer readable medium, e.g. the memory 1001, may carry a computer program comprising program code means for performing the method described herein when the computer program is run on a computer.

An at least partly electrically driven vehicle 100 comprises the control unit 1000 described herein.

It is to be understood that the present invention is not limited to the embodiments described above and illustrated in the drawings; rather, the skilled person will recognize that many changes and modifications may be made within the scope of the appended claims.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words “a” or “an” preceding an element do not exclude the presence of a plurality of such elements.

The term “configured to” used herein may also be referred to as “arranged to”, “adapted to”, “capable of” or “operative to”.

The invention claimed is:

1. A system for controlling capacitors comprised in an at least partly electrical driven vehicle, the system comprises:

a converter comprising a first capacitor connected to a first side of a three-phase bridge;

a third capacitor adapted to be controlled, via a first switch, to be either connected in parallel to or disconnected from the first capacitor, wherein the first capacitor comprises at least one of a first pole-chassis filter capacitor connected to a positive pole of a power supply and a ground plane, and a second pole-chassis filter capacitor connected to a negative pole of the power supply and the ground plane, and wherein the third capacitor is adapted to be controlled, via the first switch, to be either connected in parallel to or disconnected from the at least one pole-chassis filter capacitor, wherein the system is adapted such that, when the converter is activated and is initiated to start operating or is currently operating, the first switch is in a closed position such that the third capacitor is connected, and wherein the system is further adapted such that, when the converter is inactivated and is not in operation, the first switch is in an open position such that the third capacitor is disconnected.

2. The system according to claim 1, wherein a first pre-charge circuit is connected between the third capacitor and the first switch, and wherein the first pre-charge circuit is adapted to pre-charge the third capacitor.

3. The system according to claim 1, wherein the third capacitor is located at one of the following positions:

1) inside the converter;

2) outside the converter and with connection to poles of the power supply and after an inductive filter;

3) outside the converter and with connection to the poles of the power supply and before the inductive filter.

4. The system according to claim 1, wherein the converter comprises a second capacitor connected to a second side of the three-phase bridge which is opposite of the first side, wherein a fourth capacitor is adapted to be controlled, via a second switch, to be either connected in parallel to or disconnected from the second capacitor, wherein system is adapted such that, when the converter is activated and is initiated to start operating or is currently operating, the second switch is in a closed position such that the fourth capacitor is connected, wherein system is further adapted such that, when the converter is inactivated and is not in operation, the second switch is in an open position such that the fourth capacitor is disconnected, wherein the third capacitor and the fourth capacitor are located at opposite sides of the system.

5. The system according to claim 4, wherein a second pre-charge circuit is connected between the fourth capacitor and the second switch, and wherein the second pre-charge circuit is adapted to pre-charge the fourth capacitor.

6. The system according to claim 4, wherein the fourth capacitor is located at a position on the opposite side that corresponds to the position of the third capacitor.

7. A vehicle comprising a system according to claim 1.

8. A method for performed by a control unit for controlling capacitors in a system in an at least partly electrical driven vehicle, the system comprises:

a converter comprising a first capacitor connected to a first side of a three-phase bridge, wherein the first capacitor comprises at least one of a first pole-chassis filter capacitor connected to a positive pole of a power supply and a ground plane, and a second pole-chassis filter capacitor connected to a negative pole of the power supply and the ground plane;

a third capacitor adapted to be controlled, via a first switch, to be either connected in parallel to or disconnected from the first capacitor, the method comprises:

detecting that the converter is activated and is initiated to start operating;

when it has been detected that the converter is activated and is initiated to start operating, triggering the first switch to enter a closed position such that third capacitor is connected to the first capacitor to be connected in parallel to the at least one pole-chassis filter capacitor before the converter starts operating;

detecting that the converter is inactivated and is not in operation; and when it has been detected that the converter is inactivated and is not in operation, triggering the first switch to enter an open position such that the third capacitor is disconnected from the first capacitor by being disconnected from the at least one pole-chassis filter capacitor.

9. The method according to claim 8, wherein a first pre-charge circuit is connected between the third capacitor and the first switch, and wherein the method comprising:

after the first switch has been triggered to enter the closed position, detecting that the third capacitor is charged;

when it has been detected that the third capacitor is charged, triggering inactivation of the first pre-charge circuit;

when it has been detected that the converter is inactivated and is not in operation, triggering activation of the first pre-charge circuit.

10. The method according to claim 8, wherein the third capacitor is located at one of the following positions:

1) inside the converter;

2) outside the converter and with connection to poles of the power supply and after an inductive filter;

3) outside the converter and with connection to the poles of the power supply and before the inductive filter.

11. The method according to claim 8, wherein the converter comprises a second capacitor connected to a second side of the three-phase bridge which is opposite of the first side, wherein a fourth capacitor is adapted to be controlled, via a second switch, to be either connected in parallel to or disconnected from the second capacitor, wherein the method comprises:

when it has been detected that the converter is activated and is initiated to start operating, triggering the second switch to enter a closed position such that the fourth capacitor is connected to the second capacitor before the converter starts operating; and when it has been detected that the converter is inactivated and is not in operation, triggering the second switch to enter an open position such that the fourth capacitor is disconnected from the second capacitor.

12. The method according to claim 11, wherein a second pre-charge circuit is connected between the fourth capacitor and the second switch, and wherein the method comprises:

after the second switch has been triggered to enter the closed position, detecting that the fourth capacitor is charged; and when it has been detected that the fourth capacitor is charged, triggering inactivation of the second pre-charge circuit; and when it has been detected that the converter is inactivated and is not in operation, triggering activation of the pre-charge circuit.

13. The method according to claim 12, wherein the fourth capacitor is located at a position on the opposite side that corresponds to the position of the third capacitor.

14. A control unit for controlling capacitors in a system in an at least partly electrical driven vehicle, the control unit being configured to perform the steps of the method according to claim 8.

15. A computer readable medium carrying a computer program comprising program code for performing the steps of claim 8 when the computer program is run on a computer.

* * * * *